US006918381B2

(12) United States Patent
Palvölgyi

(10) Patent No.: US 6,918,381 B2
(45) Date of Patent: Jul. 19, 2005

(54) FUEL RETURN VALVE

(75) Inventor: Sandor Palvölgyi, Gleisdorf (AT)

(73) Assignee: Tesma Motoren-und Getriebtechnik GmbH, Sinabelkirchen (AT)

( * ) Notice: Subject to any disclaimer, the term of this patent is extended or adjusted under 35 U.S.C. 154(b) by 0 days.

(21) Appl. No.: 10/953,029

(22) Filed: Sep. 28, 2004

(65) Prior Publication Data

US 2005/0067023 A1 Mar. 31, 2005

(30) Foreign Application Priority Data

Sep. 30, 2003 (AT) ...................................... GM669/2003

(51) Int. Cl.[7] .......................... F02M 37/04; F16K 21/10

(52) U.S. Cl. ..................... 123/514; 123/459; 137/514.5

(58) Field of Search ................................ 123/514, 506, 123/456, 457, 459; 137/514.5, 509, 510, 514

(56) References Cited

U.S. PATENT DOCUMENTS 4,756,289 A * 7/1988 Rock et al. ................. 123/463
5,720,263 A * 2/1998 Frank et al. ................ 123/514
5,727,529 A * 3/1998 Tuckey ........................ 123/514
5,873,349 A * 2/1999 Tuckey et al. .............. 123/514
6,112,727 A * 9/2000 Cristiani et al. ............ 123/514
6,378,500 B1 * 4/2002 Schreckenberger ......... 123/457
6,481,418 B1 * 11/2002 Ristich et al. .............. 123/457
6,752,170 B2 * 6/2004 Muramatsu et al. ........ 137/510

* cited by examiner

*Primary Examiner*—Carl S. Miller
(74) *Attorney, Agent, or Firm*—Bachman & LaPointe, P.C.

(57) ABSTRACT

A fuel return valve comprises a housing and a closing unit, a first passage, which is line-connected to a fuel pump, a second passage, which is line-connected to an internal combustion engine, and a third passage, which is line-connected to the fuel tank, as well as a pressure chamber, being formed in the housing, which pressure chamber is in communication with the first passage, and, via the closing unit, with the third passage. To make a valve of this type maintenance-free and simple and inexpensive to produce, the closing unit is a piston which is guided in the housing attachment and is pressed by a spring arranged and supported in the housing attachment onto a sealing surface which is formed on the housing and surrounds the pressure chamber, and an annular chamber which is in communication with the third passage and with the space containing the spring is formed outside the sealing surface.

6 Claims, 3 Drawing Sheets

FUEL RETURN VALVE

BACKGROUND OF THE INVENTION

The invention relates to a fuel return valve, which comprises a housing and a closing unit, a first passage, which is line-connected to a fuel pump, a second passage, which is line-connected to an internal combustion engine, and a third passage, which is line-connected to the fuel tank, as well as a pressure chamber, being formed in the housing, which pressure chamber is in communication with the first passage, and, via the closing unit, with the third passage, which closing unit is acted on by a spring accommodated in a housing attachment.

Fuel return valves are used in the fuel supply system of motor vehicles. They are arranged in the fuel feed and serve the purpose firstly of returning surplus fuel to the fuel tank to achieve low fuel consumption in the engine, and secondly of preventing the feed line from emptying out when the engine is switched off.

A fuel return valve of the conventional design is described, for example, in Automobiltechnischen Handbuch [Handbook of Automotive Engineering] (supplement volume to the 18th edition, page 263), published by Verlag Walter de Gruyter. In this valve, the closing unit is a diaphragm inserted in a sealing manner between the housing and the housing attachment and having a small valve plate which only opens up a small throughflow opening. In other embodiments, a ball is also used instead of the valve plate. To adjust the spring force acting on the valve plate, the space which contains the spring in the housing attachment is in communication either with atmosphere or with a reduced-pressure source, for example the induction pipe of the internal combustion engine. This external connection therefore requires the use of the diaphragm which is inserted in a sealed manner. This design is complex and expensive to produce, and furthermore the diaphragm is a wearing part.

Therefore, it is an object of the invention to create a fuel return valve which is maintenance-free, simple and inexpensive to produce, yet nevertheless satisfies all functional requirements.

SUMMARY OF THE INVENTION

According to the invention, this object is achieved by virtue of the fact that the closing unit is a piston which is guided in a housing attachment and is pressed by a spring arranged and supported in the housing attachment onto a sealing surface which is formed on the housing and surrounds the pressure chamber, and that an annular chamber which is in communication with the third passage and with the space containing the spring behind the piston is formed outside the sealing surface. Therefore, the spring space can remain closed and there is no longer any need for a sealing diaphragm.

The consideration whereby atmospheric pressure also prevails in the fuel tank and consequently also in the return line plays a role in this context. The invention allows the atmospheric pressure to act on the piston. Therefore, atmospheric pressure also prevails in the annular chamber. On account of the fact that this chamber surrounds the sealing surface, it also has a stabilizing effect on the piston. The result is a very reliable and simple design; it is simple because only a very small number of components, which are also inexpensive to produce, are required.

In a refinement of the invention, the piston, on its end face, has a sealing bead which interacts with the sealing surface and describes a circle with a diameter which is larger than the largest diameter of the pressure chamber. It is preferable for the piston with the sealing bead on its end face to be an in-one injection-molded plastic part. On account of the size of the diameter and the soft sealing bead, the compressive forces and demands imposed on accuracy are low, despite a good sealing action being achieved. Consequently, the piston can also be produced in a very inexpensive multi-component injection-molding process.

There are various options for the connection between the annular space and the space in the housing attachment. By way of example, it may be effected via a passage leading around the outside or via a passage provided in the housing attachment. However, a particularly advantageous embodiment consists in the fact that the connection between the annular passage and the space containing the spring is formed by openings between the piston and the wall of the housing attachment, for which purpose it is preferable for the openings to be recesses on the lateral surface of the piston.

In a preferred embodiment, the housing comprises a basic housing, which contains the first passage, the second passage and the third passage, and an insert housing, which forms the pressure chamber and is connected to the housing attachment, and the line connection between the annular chamber and the third passage is produced via a fourth, obliquely running passage in the insert housing. Although the first part of this embodiment is known per se, by combining it with the obliquely running passage, it is even possible for the fuel return valve according to the invention to be installed in existing valve base bodies, providing a retrofit option, and this arrangement is also particularly inexpensive to produce on account of its simple design.

BRIEF DESCRIPTION OF THE DRAWINGS

In the text which follows, the invention is described and explained with reference to drawings, in which.

DETAILED DESCRIPTION

Figure 1:
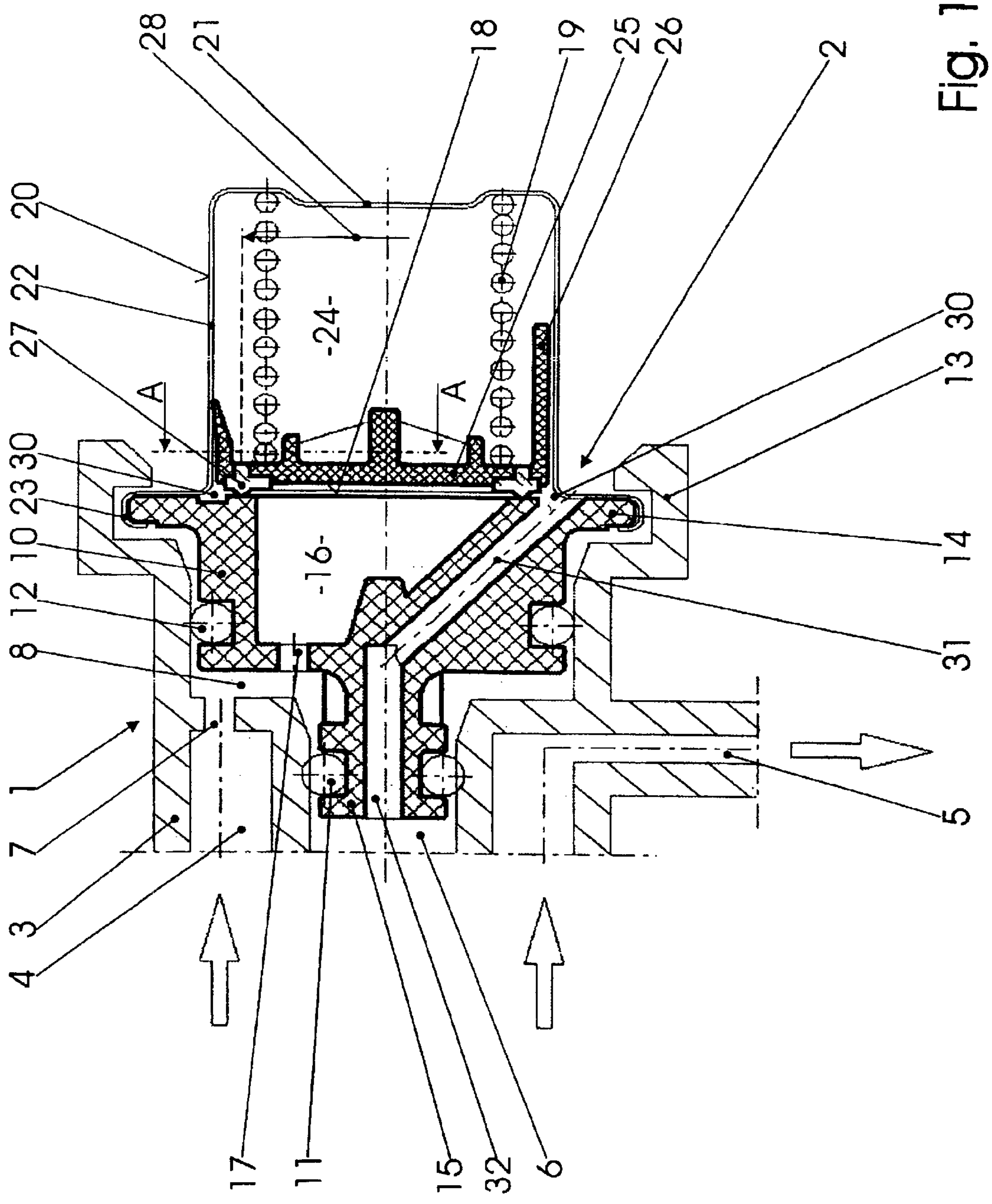
FIG. 1: shows an exemplary embodiment of the valve according to the invention in the closed position.

In FIG. 1, the housing of a fuel return valve is denoted overall by 1 and a closing unit is denoted overall by 2. In the embodiment shown, the housing 1 is formed firstly by a basic housing 3, in which a first passage 4, which is line-connected to a fuel pump (not shown), a second passage 5, which is line-connected to an internal combustion engine (not shown), and a third passage 6, which is line-connected to a fuel tank, which is likewise not shown, as well as a pressure chamber 8 are formed. The pressure chamber 8 is in communication with the first passage 4 via a feed opening 7. The third passage 6 is arranged centrally and concentrically with the center axis and is surrounded by the annular first passage 4. The respective ports for the connections indicated are no longer illustrated. An insert housing 10, which is substantially cylindrical and sealed with respect to the basic housing 3 by means of O rings 11, 12, is fitted into the basic housing 3.

The housing is divided into a basic housing 3 and an insert housing 10 for reasons of manufacture and assembly. The two parts could also be integral, i.e. the basic housing 3 may itself have all the features of the insert housing 10. A centering foot 15 of the insert housing 10 is inserted into the third passage 6, with the O ring 11 providing a seal with respect to the first passage 4. Furthermore, the insert housing 10 has a flange 14 which, by way of example, is surrounded in the style of a bayonet catch by parts 13 of the basic housing 3. A pressure chamber 16, which is in communication with the chamber 8 via an inflow opening 17, is formed in the interior of the insert housing 10. This pressure chamber ends at a sealing surface 18 which is in the form of a circular ring of relatively large diameter.

On the side remote from the basic housing 3, a housing attachment 20 is secured to the insert housing 10 by means of a turn-in flange 23 which surrounds the flange 14 of the insert housing 10. The housing attachment 20 is approximately cylindrical, has a base 21 and forms a spring space 24 which is delimited by a piston 25 forming the movable sealing element. A compression spring 19 acts between the base 19 and the piston 25. The piston 25 is a plate with a cylindrical skirt 26 at its circumference. On the side facing the sealing surface 18, the piston 25 has a soft sealing bead 27 which is likewise circular in contour. The middle diameter of the sealing bead 27 and the sealing surface 18 is denoted by 28. If the piston consists of plastic, it can be injection-molded in a single mold with the sealing bead 27 as a two component part.

The contact zone between sealing bead 27 and sealing surface 18 is surrounded by an annular chamber 30 which is in communication with the spring space 24 on one side and with a central passage on the other side, via an obliquely running passage 31 which is inclined with respect to the center axis. The central passage 32 is located on the centering flange 15 of the insert housing 10 and the latter fits into the third passage 6, the return to the fuel tank.

Figure 3:
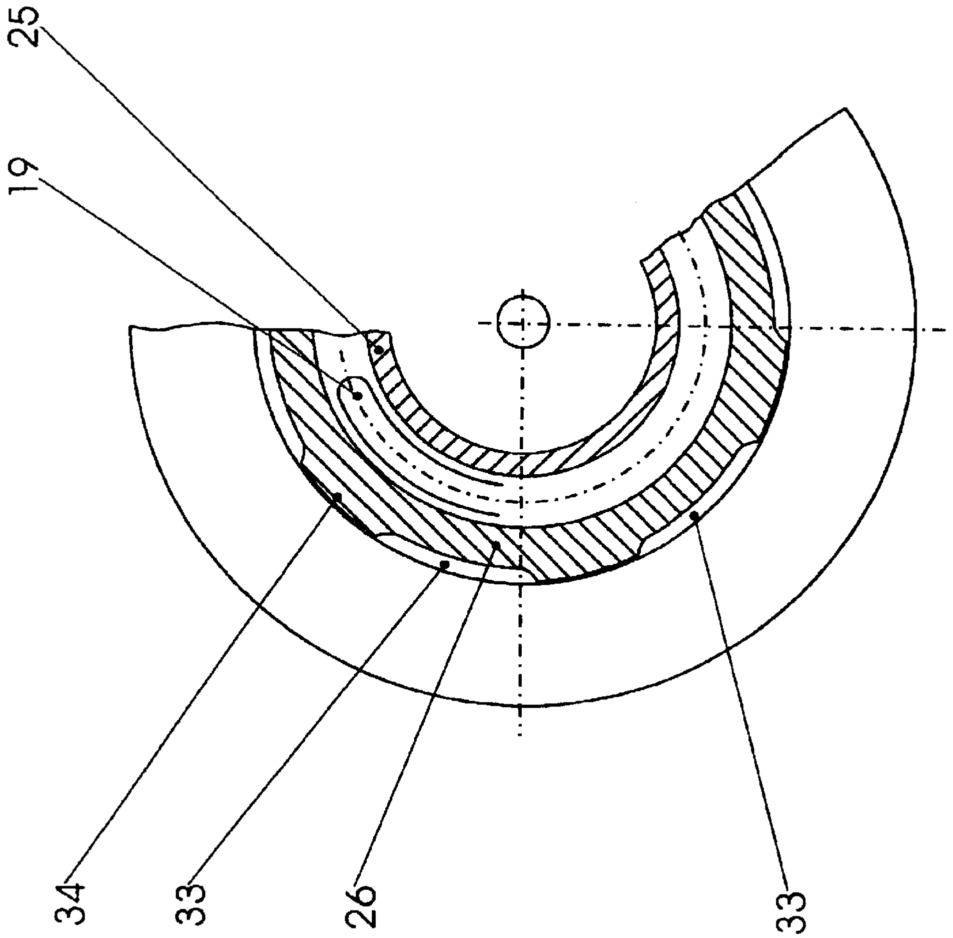
FIG. 3: shows a section of AA in FIG. 1.

It can be seen from FIG. 3 that the connection between the annular chamber 30 and the spring space 24 is effected by recesses 33 which are provided between the skirt 26 of the piston 25 and the outer shell 22 of the housing attachment 20. Guide strips 34 which guide the piston with respect to the lateral surface 22 are provided between the individual recesses 33.

FIG. 1 shows the fuel return valve according to the invention in the normal operating position, in which the fuel coming from the fuel pump flows out of the first passage 4 directly into the second passage 5 and thereby onward to the engine. Consequently, a pressure which is sufficient to open the closing unit 2 cannot build up either in the chamber 8 or in the pressure chamber 16. The pressure required for opening results from the force acting to overcome the on the piston 25 from the other side. This force is composed of the force exerted by the spring 19 and the force exerted by the pressure in the spring chamber 24. However, the pressure in the spring chamber 24, on account of the latter being connected to the annular chamber 30, and therefore via the passages 31, 32, is approximately the atmospheric pressure prevailing in the fuel tank.

Figure 2:
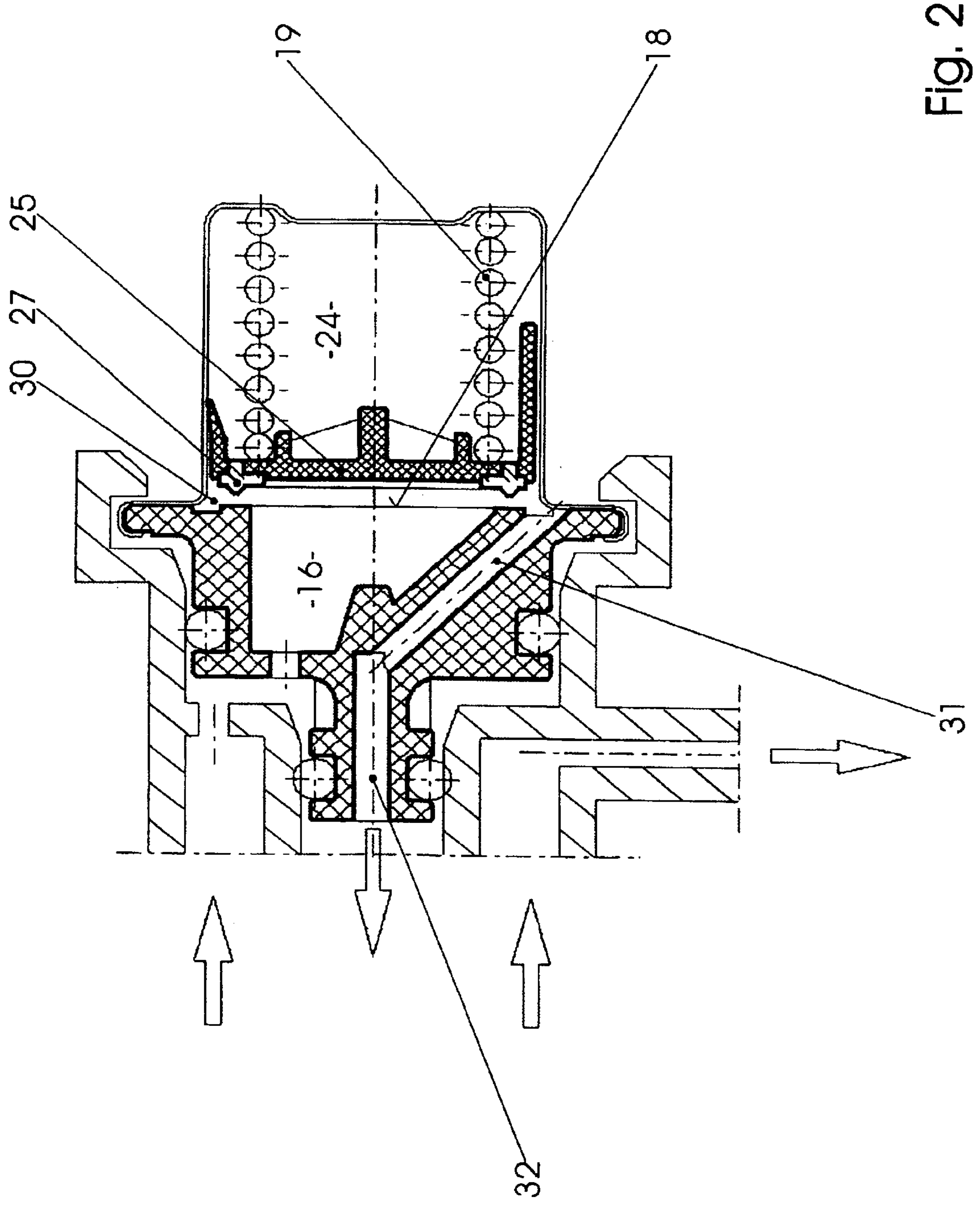
FIG. 2: is the same as FIG. 1 but in an open position.

In FIG. 2, the pressure in the chamber 16 exceeds the force acting on the piston 25 from the other side. This situation arises if either the engine is switched off or the fuel pump delivers more fuel than the engine consumes. Then, the piston 25 and with it, its sealing bead 27, is lifted off the sealing surface 18 and the fuel flows back into the fuel tank via the annular chamber 30 and the passages 31, 32.

What is claimed is:

1. A fuel return valve, comprising a housing and a closing unit, a first passage, which is line-connected to a fuel pump, a second passage, which is line-connected to an internal combustion engine, and a third passage, which is line-connected to a fuel tank, as well as a pressure chamber, being formed in the housing, which pressure chamber is in communication with the first passage, and, via the closing unit, with the third passage, which closing unit is acted on by a spring accommodated in a housing attachment, wherein a) the closing unit comprises a piston which is guided in the housing attachment and is pressed by a spring arranged and supported in the housing attachment onto a sealing surface which is formed on the housing and surrounds the pressure chamber, and wherein b) an annular chamber which is in communication with the third passage and with the space containing the spring is formed outside the sealing surface.

2. The fuel return valve as claimed in claim 1, wherein the piston, on an end face, has a sealing bead which interacts with the sealing surface and describes a circle with a diameter which is larger than the largest diameter of the pressure chamber.

3. The fuel return valve as claimed in claim 2, wherein the piston and the sealing bead, at its end face are an in-one injection-molded plastic part.

4. The fuel return valve as claimed in claim 1, wherein the connection between the annular passage and the space containing the spring is formed by openings between the piston and the outer shell of the housing attachment.

5. The fuel return valve as claimed in claim 4, wherein the openings between the piston and the outer shell of the housing attachment are recesses on the skirt of the piston.

6. The fuel return valve as claimed in claim 1, wherein the housing comprises a basic housing, which contains the first passage, the second passage and the third passage, and an insert housing, which forms the pressure chamber and is connected to the housing attachment, and wherein the line connection between the annular chamber and the third passage is produced via a fourth, obliquely running passage in the insert housing.

* * * * *